US012747758B2

United States Patent
(12) United States Patent
Makino et al.

(10) Patent No.: US 12,747,758 B2
(45) Date of Patent: Sep. 29, 2026

(54) BEARING DEVICE

(71) Applicant: NTN Corporation, Osaka (JP)

(72) Inventors: Tomoaki Makino, Iwata (JP); Takashi Koike, Iwata (JP); Hiroaki Ohba, Iwata (JP)

(73) Assignee: NTN Corporation, Osaka (JP)

( * ) Notice: Subject to any disclaimer, the term of this patent is extended or adjusted under 35 U.S.C. 154(b) by 79 days.

(21) Appl. No.: 18/851,228

(22) PCT Filed: Mar. 7, 2023

(86) PCT No.: PCT/JP2023/008532
§ 371 (c)(1),
(2) Date: Sep. 26, 2024

(87) PCT Pub. No.: WO2023/189277
PCT Pub. Date: Oct. 5, 2023

(65) Prior Publication Data
US 2025/0215934 A1 Jul. 3, 2025

(30) Foreign Application Priority Data

Mar. 30, 2022 (JP) ................................ 2022-055789
Mar. 30, 2022 (JP) ................................ 2022-055790

(51) Int. Cl.
*F16C 41/00* (2006.01)

(52) U.S. Cl.
CPC ........ *F16C 41/004* (2013.01); *F16C 2233/00* (2013.01)

(58) Field of Classification Search
CPC .... F16C 41/007; F16C 41/04; F16C 2233/00; F16C 41/004
See application file for complete search history.

(56) References Cited

U.S. PATENT DOCUMENTS 6,948,856 B2 * 9/2005 Takizawa .............. F16C 33/586 384/448
9,328,766 B2 * 5/2016 Benkert ................ F16C 41/007
2002/0054719 A1 5/2002 Takizawa et al.
2005/0174106 A1 8/2005 Inoue
2013/0283744 A1 10/2013 Nakamura et al.
2015/0316094 A1 11/2015 Rink
(Continued)

FOREIGN PATENT DOCUMENTS

DE 102012215582 A1 3/2014
EP 3450816 A1 3/2019
(Continued)

OTHER PUBLICATIONS

Translation of JP2021127831 obtained Feb. 5, 2026.*
(Continued)

*Primary Examiner* — James Pilkington
(74) *Attorney, Agent, or Firm* — RIMON P.C.

(57) ABSTRACT

A bearing device includes a bearing and a retaining member. The retaining member is fixed to any one ring of an outer ring and an inner ring. A circuit board is fixed to, in an axial direction, a front surface of a side plate portion. At least one gas sensor, which detects a state of the bearing, and a wireless communication circuit, which wirelessly transmits an output of the gas sensor to outside, are mounted on the circuit board.

12 Claims, 11 Drawing Sheets

(56) References Cited

U.S. PATENT DOCUMENTS

| | | | |
|---|---|---|---|
| 2019/0086382 | A1 | 3/2019 | Inaba et al. |
| 2023/0086645 | A1 | 3/2023 | Koike et al. |

FOREIGN PATENT DOCUMENTS

| | | | | | |
|---|---|---|---|---|---|
| JP | 2002-206528 | A | | 7/2002 | |
| JP | 2003-166696 | A | | 6/2003 | |
| JP | 2004-132477 | A | | 4/2004 | |
| JP | 2005-030588 | A | | 2/2005 | |
| JP | 2009-172519 | A | | 8/2009 | |
| JP | 4530888 | B2 | | 8/2010 | |
| JP | 2012-163506 | A | | 8/2012 | |
| JP | 2017-72170 | A | | 4/2017 | |
| JP | 2019-180183 | A | | 10/2019 | |
| JP | 2021-063591 | A | | 4/2021 | |
| JP | 2021-127831 | A | | 9/2021 | |
| WO | 2012/086606 | A1 | | 6/2012 | |
| WO | 2017/188314 | A | | 11/2017 | |
| WO | WO-2017188314 | A1 | * | 11/2017 | .............. F16C 19/52 |

OTHER PUBLICATIONS

Translation of WO2017188314 obtained Feb. 5, 2026.*
International Search Report dated May 16, 2023, from International Application No. PCT/JP2023/008532, 7 pages.

* cited by examiner

BEARING DEVICE

CROSS-REFERENCE TO RELATED APPLICATIONS

This application is the U.S. National Phase under 35 U.S.C. § 371 of International Application No. PCT/JP2023/008532, filed on Mar. 7, 2023, which claims the benefit of foreign priority to Japanese Patent Application Nos. 2022-055789 filed on Mar. 30, 2022, and 2022-055790 filed on Mar. 30, 2022, the entire contents of each of which are hereby incorporated by reference.

TECHNICAL FIELD

The present disclosure relates to a bearing device.

BACKGROUND ART

A bearing device including a sensor provided at a position adjacent to a bearing is used for monitoring the state of a rolling bearing for safety of the device. This bearing device may be configured to wirelessly transmit data detected by the sensor in order to transmit such data with greater convenience.

For example, Japanese Patent Laying-Open No. 2017-72170 (PTL 1) discloses an example of the bearing device described above. In Japanese Patent Laying-Open No. 2017-72170, a multipole ring magnet is provided on one axial end face of a retainer of a bearing, an annular seal is placed to close a gap between an inner ring and an outer ring, and a power generation coil and a wireless processing circuit are placed on the surface of the annular seal on the side facing the multipole ring magnet.

Also, WO 2017/188314 (PTL 2) discloses an example in which the sensor of the bearing device described above is a gas sensor that detects deterioration of a lubricant used for the bearing.

CITATION LIST

Patent Literature

PTL 1: Japanese Patent Laying-Open No. 2017-72170
PTL 2: WO 2017/188314

SUMMARY OF INVENTION

Technical Problem

In the bearing device of Japanese Patent Laying-Open No. 2017-72170, if the annular seal is made of metal, radio waves from the wireless processing circuit are blocked, failing to transmit the radio waves to outside of the bearing. This is because the power generation coil and the wireless processing circuit are placed to face axially inward (rolling element side). In contrast, as the annular seal is made of a non-metallic material such as a resin or the annular seal is provided with a sufficient number of slits for radio waves to pass therethrough, the radio waves can be transmitted to outside of the bearing. In this case, however, the rigidity of the annular seal decreases because the annular seal is made of resin. This may inhibit an action of the bearing device that is vibrating.

Next, in WO 2017/188314, the gas sensor is placed outside a housing that accommodates a bearing while being spaced from the housing. In this case, however, the detection sensitivity of the gas sensor may decrease due to an increased distance between the gas sensor and the bearing.

The present disclosure has been made in view of the above problems. The present disclosure has an object to provide a bearing device that can stably perform wireless transmission of radio waves to outside of a bearing and prevent a decrease in detection sensitivity of a gas sensor.

Solution to Problem

A bearing device according to the present disclosure includes a bearing and a retaining member. The bearing includes an outer ring, an inner ring, and a rolling element. The retaining member is fixed to any one ring of the outer ring and the inner ring. The retaining member includes a side plate portion having a width in a radial direction and extending in a circumferential direction. At least part of a power supply that generates electric power and a circuit board are fixed to the retaining member. The circuit board is fixed to, in an axial direction, a surface of the side plate portion not facing the rolling element. At least one gas sensor and a wireless communication circuit are mounted on the circuit board, the at least one gas sensor detecting a state of the bearing, the wireless communication circuit wirelessly transmitting an output of the at least one gas sensor to outside.

A bearing device according to the present disclosure includes a bearing and a retaining member. The bearing includes an outer ring, an inner ring, and a rolling element. The retaining member is fixed to any one ring of the outer ring and the inner ring. The retaining member includes a side plate portion having a width in a radial direction and extending in a circumferential direction. At least part of a power supply that generates electric power and a circuit board are fixed to the retaining member. The circuit board is fixed to, in an axial direction, a surface of the side plate portion not facing the rolling element. At least one gas sensor and a wireless communication circuit are mounted on the circuit board, the at least one gas sensor detecting a state of the bearing, the wireless communication circuit wirelessly transmitting an output of the at least one gas sensor to outside. The side plate portion has a through hole connecting a first surface facing the rolling element to a second surface located opposite to the first surface. A porous membrane is attached so as to cover the through hole.

Advantageous Effects of Invention

According to the present disclosure, a bearing device can be provided that can stably perform wireless transmission of radio waves to outside of a bearing and prevent a decrease in detection sensitivity of a gas sensor.

DESCRIPTION OF EMBODIMENTS

The present embodiment will be described below with reference to the drawings.

Embodiment 1

<Structure of Bearing Device>

Figure 1:
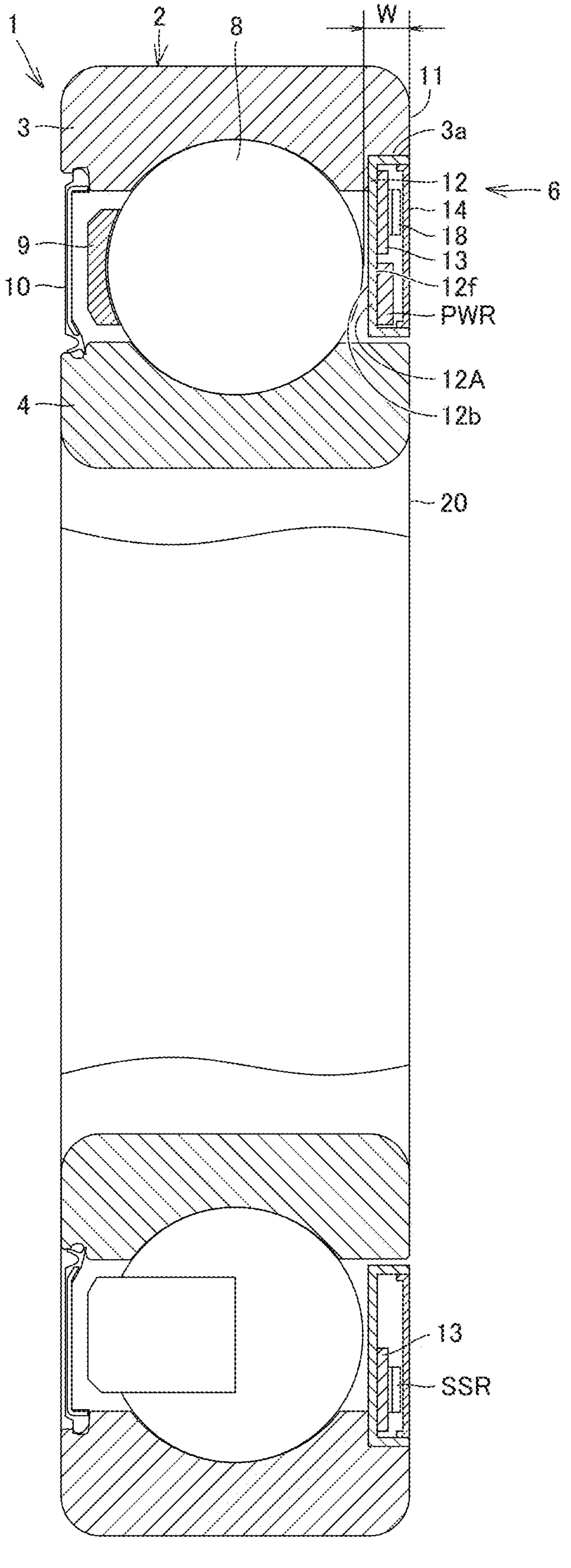
FIG. 1 is a sectional view of a bearing device of Embodiment 1.

FIG. 1 is a sectional view of a bearing device of Embodiment 1. This corresponds to, for example, a sectional view in a plane including an axis of rotation O in FIG. 2 of Embodiment 2, which will be described later. The position of each member fixed to a retaining member 12 in FIG. 1 is not necessarily consistent with its actual position. Referring to FIG. 1, a bearing device 1 of the present embodiment includes a bearing 2 and a sensor unit 6. Herein, bearing 2 is a standard bearing having axial dimensions described in a specific standard. The standard bearing is, for example, a bearing having dimensions described in the ISO standard and the JIS standard. Bearing 2 is a radial bearing, and axial dimensions thereof from one end to the other end of bearing 2 are dimensions defined in ISO 15 or JISB 1512-1. Bearing 2 will also be referred to as standard bearing 2 below.

Bearing 2 includes an outer ring 3, an inner ring 4, a rolling element 8, a retainer 9, and a seal 10. In bearing 2, for example, outer ring 3 serves as a stationary ring, and inner ring 4 serves as a rolling ring. Although bearing 2 will be described as a deep-groove ball bearing by way of example, the type of bearing 2 is not limited to the deep-groove ball bearing. Bearing 2 can be selected from the model number sizes of standard bearings in which a distance W between an end face 11 and rolling element 8 of bearing 2 allows accommodation of sensor unit 6. End face 11 is also the end face of outer ring 3.

A plurality of rolling elements 8 are spaced from each other in the circumferential direction of bearing 2 (the depth direction in FIG. 1). What retains rolling elements 8 is retainer 9. Retainer 9 is a resin member. Retainer 9 is opened on a first end face side (right in FIG. 1) in the horizontal direction of FIG. 1, which is the axial direction. Retainer 9 has a shape to be coupled on a second end face side (left in FIG. 1) in the axial direction. In FIG. 1, thus, retainer 9 is arranged only in approximately the left region relative to the center of rolling element 8, and retainer 9 is not arranged in the right region relative to the center of rolling element 8.

Sensor unit 6 includes a retaining member 12, a circuit board 13, and a lid 14. Retaining member 12 is a magnetic material and is made of metal. Retaining member 12 is arranged at a position on the first end face side (right in FIG. 1) of retainer 9 relative to rolling element 8. In other words, retaining member 12 is arranged, in the axial direction, on the side on which retainer 9 is opened and retainer 9 is not arranged. Retaining member 12 is arranged at a position at which retainer 9 should be originally arranged.

Retaining member 12 includes a side plate portion 12A. Side plate portion 12A has a width extending from outer ring 3 to inner ring 4 in the axial direction of bearing 2 (the vertical direction in FIG. 1). Side plate portion 12A extends in the circumferential direction, that is, so as to draw an annular ring shape. In other words, side plate portion 12A extends continuously (for one round) in the circumferential direction. Retaining member 12 is formed of side plate portion 12A, and an outside surface and an inside surface in the radial direction.

Side plate portion 12A is arranged, at a position (inside in bearing 2) of retaining member 12 which is axially closest to rolling element 8, adjacent to rolling element 8. Side plate portion 12A has a back surface 12*b* on the side facing rolling element 8, and a front surface 12*f* on the side opposite to back surface 12*b* (i.e., the side not facing rolling element 8). In other words, back surface 12*b* faces the inside of bearing 2, and front surface 12*f* faces the outside of bearing 2.

At least part of a power supply PWR, which can generate electric power, and circuit board 13 are fixed to retaining member 12. Power supply PWR of FIG. 1 may be, for example, a power supply in any of Embodiments 2 to 4 described later or a power supply of any other type. In other words, power supply PWR of FIG. 1 is a general term for power supplies of every type. Circuit board 13 is fixed to front surface 12*f* of side plate portion 12A of retaining member 12.

One or more gas sensors SSR that monitor and detect the state of bearing 2 are mounted on circuit board 13. Gas sensor SSR of FIG. 1 may be of any type. Gas sensor SSR is a general term for sensors that can detect gas. A wireless communication circuit 18 is further mounted on circuit board 13.

Deterioration (oxidation) of a lubricant used for bearing 2 starts from the reaction that produces an alkyl radical under the influence of light, heat, metal, or the like. An aldehyde, a ketone, a carboxylic acid, an ester, or the like is produced as a primary product and a secondary product. Gas sensor SSR described above may be a sensor of any type that can detect the above-mentioned product. For example, gas sensor SSR may be a gas sensor that can detect a minute amount of carbonyl compound (e.g., formaldehyde, acetaldehyde) with high accuracy, which is a main component of the odor caused when the lubricant of bearing 2 deteriorates.

Lid 14 is a non-metallic (resin) sealing member covering circuit board 13. Lid 14 protects circuit board 13 fixed to retaining member 12 and protects the inside of sensor unit 6. Circuit board 13 may be sealed with a resin sealing member instead of lid 14. Also, lid 14 protects the member (e.g., wireless communication circuit 18, gas sensor SSR, or the like) fixed to front surface 12*f* of side plate portion 12A, in addition to circuit board 13.

The radially-outward outside surface of retaining member 12 is fitted into, and thus fixed to, a first cut-away portion 3*a* formed in outer ring 3. Particularly when inner ring 4 is a stationary ring, retaining member 12 may be fixed to inner ring 4. Retaining member 12 is press-fitted or bonded so as not to extend axially outward beyond end face 11 of outer ring 3. Retaining member 12 may be fixed by press-fitting and bonding, or may be fixed by any other method. When retaining member 12 is fixed to first cut-away portion 3*a*, a certain gap is left between rolling element 8 and retaining member 12. This can avoid rolling element 8 and retaining member 12 from contacting each other owing to the gap also when a displacement occurs axially.

As retaining member 12 is arranged so as not to extend axially outward beyond end face 11 of outer ring 3, circuit board 13 and power supply PWR fixed to retaining member 12 are also arranged so as not to extend axially outward beyond end face 11 of outer ring 3. Retaining member 12, circuit board 13, and power supply PWR are preferably arranged so as not to extend axially outward beyond end face 20 of inner ring 4.

Functions and Effects

Bearing device 1 according to the present disclosure includes bearing 2 and retaining member 12. Bearing 2 includes outer ring 3, inner ring 4, and rolling element 8. Retaining member 12 is fixed to any one ring of outer ring 3 and inner ring 4. Retaining member 12 includes side plate portion 12A having a width in the radial direction and extending in the circumferential direction. At least part of power supply PWR that can generate electric power and circuit board 13 are fixed to retaining member 12. Circuit board 13 is fixed to, in the axial direction, a surface (front surface 12*f*) of side plate portion 12A not facing rolling element 8. At least one gas sensor SSR that detects a state of bearing 2 and wireless communication circuit 18 that wirelessly transmits an output of gas sensor SSR to outside are mounted on circuit board 13.

Since circuit board 13 is fixed to front surface 12*f*, circuit board 13 is fixed onto retaining member 12 so as to face the outside of bearing 2. Thus, even when retaining member 12 made of a metal having rigidity higher than that of a resin is used, the following problem can be suppressed, for example, a problem of failing to transmit radio waves from wireless communication circuit 18 or the like mounted on circuit board 13 to outside of bearing 2 because the radio waves are blocked. In other words, wireless transmission of radio waves to outside of bearing 2 can be performed stably.

Wireless transmission of radio waves to outside of bearing 2 can be performed stably by wireless communication circuit 18 that receives an output signal of gas sensor SSR and wirelessly transmits the output signal to outside.

According to the present disclosure, thus, bearing device 1 can be provided that can prevent a decrease in detection sensitivity of gas sensor SSR and can stably perform wireless transmission of radio waves to outside of bearing 2, irrespective of the quality of material of retaining member 12.

In bearing device 1 described above, bearing 2 includes retainer 9 including rolling elements 8 spaced from each other in the circumferential direction. Retainer 9 has a shape to be opened on the first end face side and coupled on the second end face side in the axial direction. Retaining member 12 is arranged at a position on the first end face side of retainer 9 relative to rolling element 8.

In bearing device 1 described above, since one axial end face of retainer 9 is opened, a space for arranging circuit board 13, power supply PWR, and the like is provided in the opened portion (the portion in which retainer 9 is originally arranged). In other words, the space for arranging circuit board 13 and power supply PWR can be effectively provided inside bearing 2. Also, gas sensor SSR that detects a state of, for example, deterioration of the lubricant of bearing 2 can be arranged in the space described above. Thus, gas sensor SSR can be arranged at a position very close to bearing 2, enabling highly accurate detection of an abnormality of bearing 2 by gas sensor SSR.

What are more prone to oxidation due to, particularly, heat and metal (abrasion powder) are the parts of the lubricant, which are close to outer ring 3, inner ring 4, and rolling element 8 of bearing 2. Thus, when gas sensor SSR is arranged in the space described above, deterioration due to oxidation of the lubricant can be detected with high accuracy.

In bearing device 1 described above, retaining member 12 may be made of metal.

Since retaining member 12 is made of metal, retaining member 12 can retain circuit board 13 and gas sensor SSR placed on circuit board 13 so as to have high rigidity. Accordingly, if retaining member 12 is directly fixed to vibrating bearing 2, a malfunction of gas sensor SSR can be suppressed. This allows bearing device 1 to stably perform monitoring of deterioration of the lubricant by gas sensor SSR and wireless transmission of data detected by gas sensor SSR, even in a use environment in which vibrations are applied.

Embodiment 2

<Structure of Bearing Device>

Figure 2:
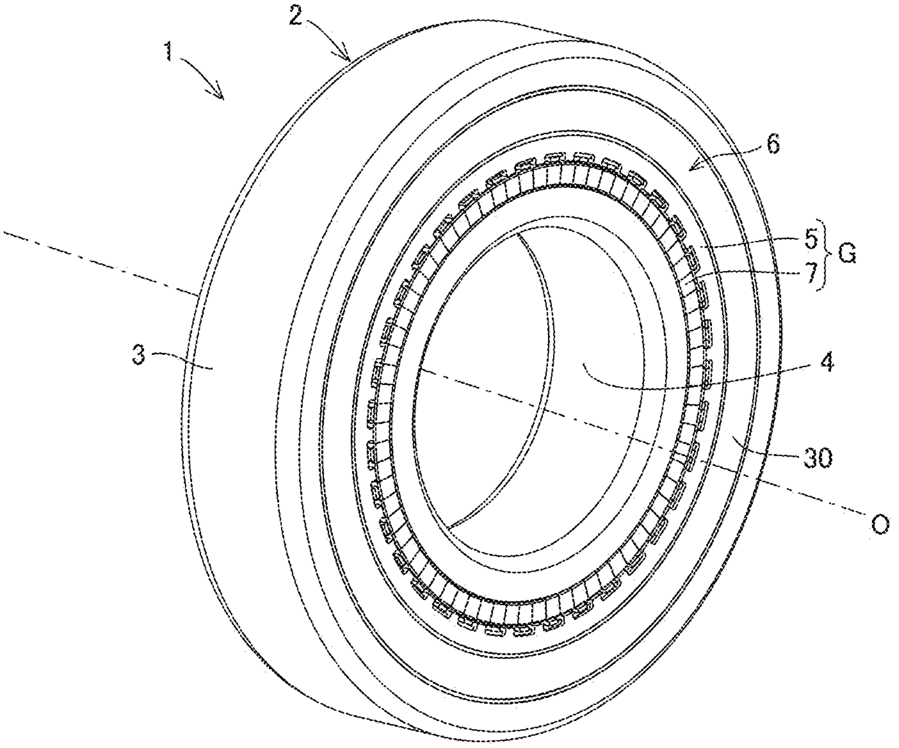
FIG. 2 is a perspective view of the entire bearing device of Embodiment 2.

In the description of a bearing device in each embodiment below, the same components as those of the bearing device of the embodiment described above have the same reference characters allotted, and description thereof will not be repeated unless there is any difference particularly in structure and function. In Embodiment 2, an electromagnetic generator is used as power supply PWR included in bearing device 1 of Embodiment 1. FIG. 2 is a perspective view of the entire bearing device of Embodiment 2. Referring to FIG. 2, bearing device 1 includes bearing 2, sensor unit 6, and a magnetic ring 7.

Sensor unit 6 includes retaining member 12, circuit board 13, lid 14, and a stator 5. Circuit board 13 is fixed to the radially outer region of side plate portion 12A of retaining member 12, and stator 5 is arranged so as to entirely include retaining member 12.

Figure 3:
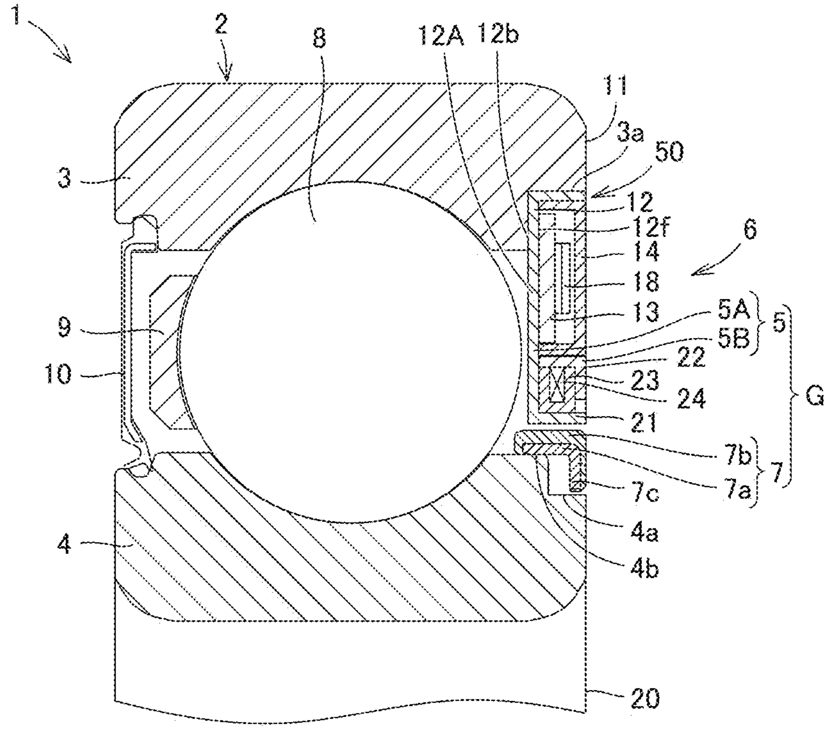
FIG. 3 is a sectional view of a bearing in a plane including an axis of rotation.

Lid 14, which is a non-metallic member made of resin, protects the inside of sensor unit 6. Lid 14 of the present embodiment may be arranged so as to cover the region other than stator 5, as shown in FIG. 3. Alternatively, lid 14 may be arranged so as to cover stator 5 as well. In any case, lid 14 covers circuit board 13.

Stator 5 includes two magnetic members 21, 22, a bobbin 23, and a coil 24. Retaining member 12 is used as magnetic member 21 of stator 5.

Magnetic ring 7 is a magnetic member with N poles and S poles magnetized alternately in the circumferential direction. Stator 5 is fixed to outer ring 3, and magnetic ring 7 is fixed to inner ring 4. Stator 5 and magnetic ring 7 constitute a generator G. Generator G is a craw-pole-type generator and may be a generator of any other structure. The alternate long and short dash line of FIG. 2 is axis of rotation O of bearing 2.

FIG. 3 is a sectional view of the bearing in a plane including the axis of rotation. Referring to FIG. 3, stepped first cut-away portion 3*a* is formed in the inner circumferential surface of outer ring 3 at one end as in Embodiment 1. In the outer circumferential surface of inner ring 4 at one end, a stepped second cut-away portion 4*a* is formed so as to face first cut-away portion 3*a*. In the axial direction of bearing 2, an annular recess 50, which is cut out toward rolling element 8 by first cut-away portion 3*a* and second cut-away portion 4*a*, is formed over outer ring 3 and inner ring 4.

Magnetic ring 7 includes a core metal 7*a* and a multipolar magnet 7*b*. Multipolar magnet 7*b* is obtained by, for example, vulcanization bonding of a magnetic material containing kneaded magnetic powder and rubber to core metal 7*a* and alternate magnetization of N poles and S poles in the circumferential direction of bearing 2. Core metal 7*a* of magnetic ring 7 has a flange portion 7*c* for increased rigidity. Magnetic ring 7 is fixed to outside surface 4*b* of inner ring 4 by, for example, press fitting. Flange portion 7*c* is fitted in second cut-away portion 4*a* formed in inner ring 4. Magnetic ring 7 is disposed so as not to extend beyond end face 20 of inner ring 4.

Magnetic ring 7, stator 5, and circuit board 13 are arranged inside annular recess 50 so as not to overlap each other in the radial direction of bearing 2. As a result, each component can be arranged inside annular recess 50, resulting in a reduced axial thickness of bearing 2. Further, in bearing device 1, for example, magnetic ring 7 is fixed to inner ring 4, and stator 5 is fixed to outer ring 3 located at the opposite position. Since inner ring 4 and outer ring 3 are smaller than retainer 9 in vibrations in the axial direction of bearing 2, a stable amount of power generation can be achieved by generator G.

Figure 4:
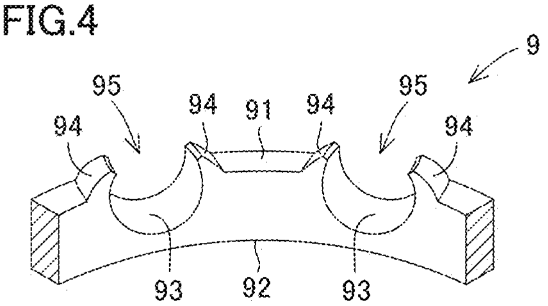
FIG. 4 is a view for describing a retainer.

FIG. 4 is a view for describing a retainer. Referring to FIG. 4, retainer 9 has recesses 93 formed at regular pitches in the circumferential direction of end face 91 in the axial direction of an annular retainer body. A pair of claw portions 94, 94 are formed so as to project from opening ends of recess 93 facing each other in the circumferential direction. Recess 93 and the pair of claw portions 94, 94 form a pocket 95 in which rolling element 8 shown in FIG. 3 is accommodated. As described above, retainer 9 has a shape to be opened on the end face 91 side and coupled on the end face 92 side. Retainer 9, which is a resin member, is arranged to prevent sensor unit 6 and magnetic ring 7 from extending beyond end face 11 and end face 20 to the opening side.

Figure 5:
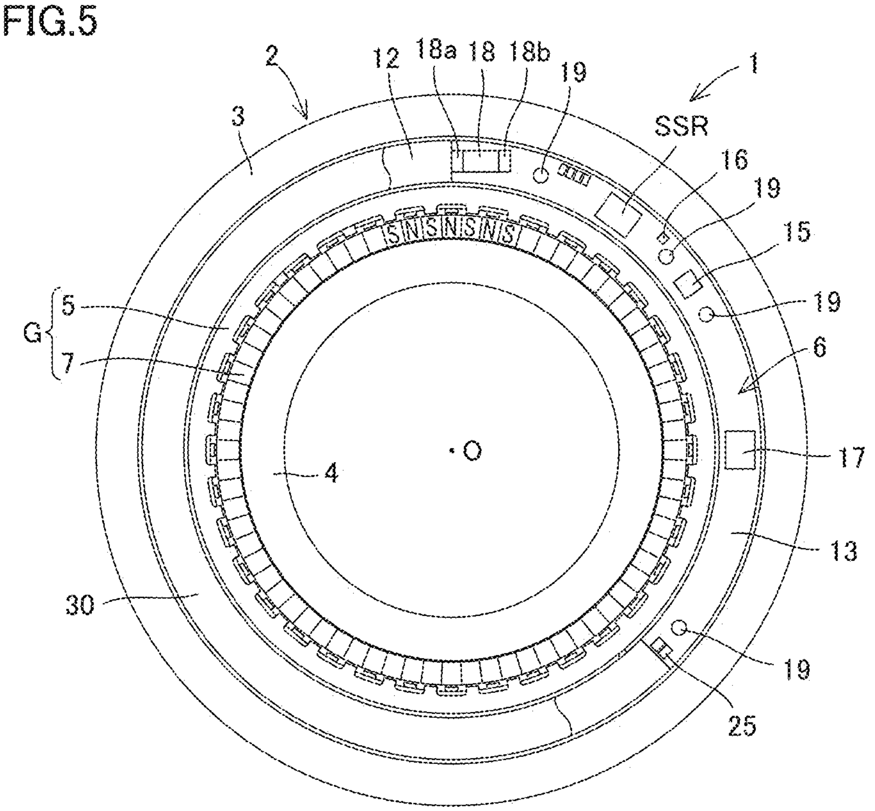
FIG. 5 is a view of the bearing device viewed from the sensor unit side.

FIG. 5 is a view of the bearing device viewed from the sensor unit side. In FIG. 5, part of lid 14 is omitted such that the inside of sensor unit 6 is visible. Referring to FIG. 5, one or more gas sensors SSR that monitor the state of bearing 2 are mounted on circuit board 13. In addition, for example, an acceleration sensor 15 and a temperature sensor 16 may be mounted on circuit board 13. Gas sensor SSR may be inserted through a hole (not shown) provided in side plate portion 12A of retaining member 12 and mounted on the back surface of circuit board 13 so as to be closer to (or be in contact with) the end face of first cut-away portion 3*a* of outer ring 3. This allows gas sensor SSR to approach outer ring 3 and accurately detect deterioration of the lubricant of bearing 2.

A power supply circuit 17 and a wireless communication circuit 18 are further mounted on circuit board 13. Power supply circuit 17 rectifies alternate-current (AC) power generated by generator G and converts it into direct-current (DC) power. In other words, power supply circuit 17 is totally different from power supply PWR (see FIG. 1), that is, generator G (electromagnetic generator) in the present embodiment. Gas sensor SSR, acceleration sensor 15, temperature sensor 16, and wireless communication circuit 18 use the DC power converted by power supply circuit 17. A terminal 25 is arranged on circuit board 13.

Wireless communication circuit 18 includes an antenna portion 18*a*. Wireless communication circuit 18 wirelessly transmits an output of gas sensor SSR that monitors the state of, for example, deterioration of the lubricant of bearing 2 to outside using antenna portion 18*a*. Circuit board 13 is fixed to retaining member 12 with a plurality of screws 19. Circuit board 13 may be fixed to retaining member 12 by adhesion. Circuit board 13 with wireless communication circuit 18 mounted thereon is arranged to face lid 14 made of resin. Thus, wireless communication circuit 18 has a structure that is not hermitically sealed with a conductive material such as metal. This enables wireless communication using antenna portion 18*a* in wireless communication circuit 18.

Wireless communication circuit 18 includes an operation unit 18*b*. Operation unit 18*b* is, for example, a typically-known central processing unit (CPU) that analyzes the components of a gas detected by gas sensor SSR. For the sake of clarity, operation unit 18*b* is arranged adjacent to the body of wireless communication circuit 18 in FIG. 5. However, the present disclosure is not limited to such a manner. Operation unit 18*b* may be mounted in the body of wireless communication circuit 18 so as not to be viewed from outside. Operation unit 18*b* wirelessly transmits data on the gas analysis result received from gas sensor SSR to outside.

Figure 6:
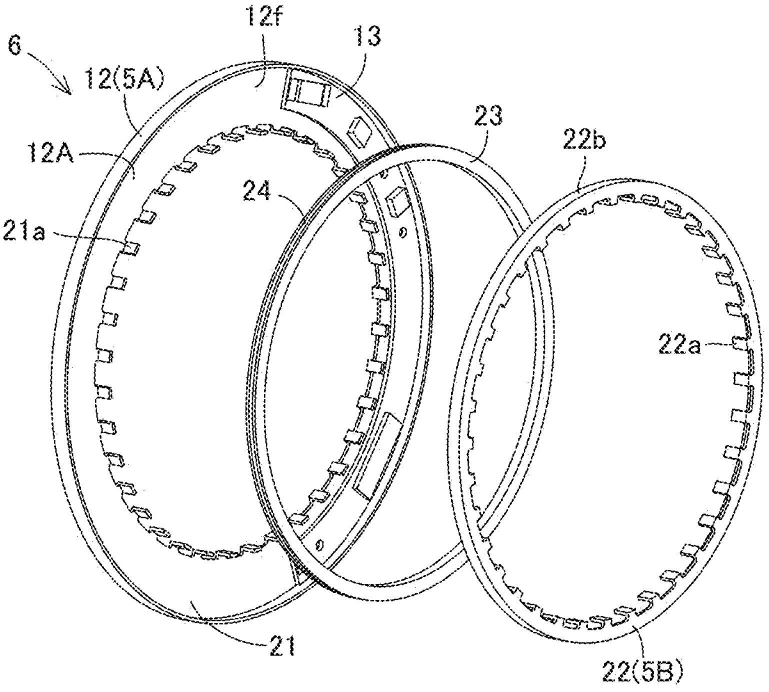
FIG. 6 is an exploded perspective view of the sensor unit in Embodiment 2.
Figure 7:
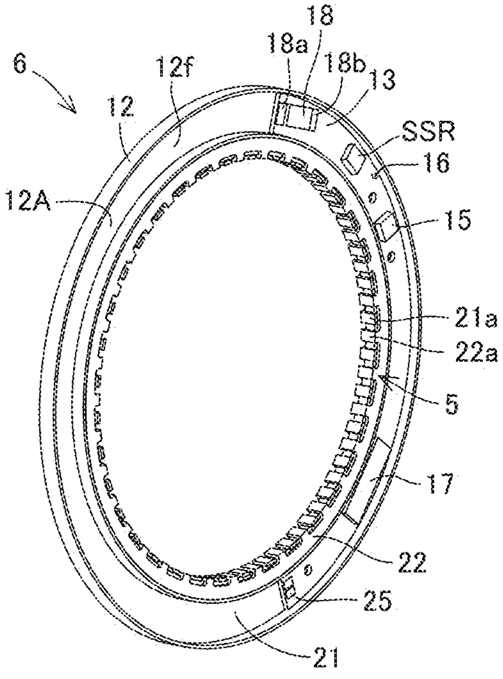
FIG. 7 is a perspective view of the sensor unit after being assembled in Embodiment 2.

FIG. 6 is an exploded perspective view of the sensor unit in Embodiment 2. FIG. 7 is a perspective view of the sensor unit after being assembled in Embodiment 2. Referring to FIGS. 6 and 7, circuit board 13 is fixed to front surface 12*f* of side plate portion 12A of retaining member 12 not facing rolling element 8. Circuit board 13 is arranged in the relatively axially outer region of front surface 12*f*. Stator 5 includes a stator 5A and a stator 5B. Stator 5A corresponds to retaining member 12 and corresponds to magnetic member 21. Stator 5B corresponds to magnetic member 22. In other words, stator 5A, retaining member 12, and magnetic member 21 are the same, and stator 5B and magnetic member 22 are the same.

Magnetic members 21, 22 have a U-shaped cross section. Magnetic member 21 occupies the entire retaining member 12, whereas magnetic member 22 is arranged in the radially inner region of retaining member 12. The radial inner region of the U-shaped cross section of magnetic member 21 faces the U-shaped cross section of magnetic member 22. Between magnetic members 21, 22 facing each other, coil 24 including bobbin 23 is attached so as to be surrounded by magnetic members 21, 22. A plurality of claw portions 21*a* are formed in the inner circumferential portion of magnetic member 21. A plurality of claw portions 22*a* are formed in the inner circumferential portion of magnetic member 22. Coil 24 around which a magnet wire is wound several rounds is arranged in a groove provided in bobbin 23 in the circumferential direction. Bobbin 23 may not be provided.

What corresponds to the perspective view of the sensor unit of FIG. 7 in Embodiment 1 described above does not include stator 5, claw portions 21*a*, and claw portions 22*a*, but basically has a similar aspect to that of FIG. 7.

The method of assembling stator 5 will be described below. First, with bobbin 23 around which coil 24 is wound being inserted into magnetic member 22, claw portions 21*a* of magnetic member 21 and claw portions 22*a* of magnetic member 22 are assembled so as to be alternately spaced from each other in the circumferential direction with a distance in between. Subsequently, an outer circumferential surface 22*b* of magnetic member 22 is fixed such that an end thereof is in contact with front surface 12*f* of side plate portion 12A of magnetic member 21. At this time, openings of magnetic member 21 and magnetic member 22 face each other, such that bobbin 23 and coil 24 are accommodated in these openings.

Claw portions 21*a* of magnetic member 21 and claw portions 22*a* of magnetic member 22 are arranged to face each other with a distance left between multipolar magnet 7*b* of magnetic ring 7, shown in FIG. 3, and the claw portions. Claw portions 21*a* of magnetic member 21 and claw portions 22*a* of magnetic member 22 in stator 5, and magnetic ring 7 constitute craw-pole-type generator G. The total number of claw portions 21*a*, 22*a* is equal to the number of poles of multipolar magnet 7*b* (the total number of N poles and S poles).

For example, a magnetic flux from the N pole of multipolar magnet 7*b* enters magnetic member 21 (or magnetic member 22) from claw portions 21*a* (or claw portions 22*a*), which are magnetic poles, goes around coil 24, and returns to the S pole of multipolar magnet 7*b* via adjacent claw portions 22*a* (or claw portions 21*a*). The direction of the magnetic flux is reversed as the positions of the N pole and the S pole of multipolar magnet 7*b* are changed by rotation of inner ring 4. An alternating magnetic field generated as described above generates AC power at the opposite ends of coil 24.

The ends (not shown) of coil 24 drawn from stator 5, which are the start and end of winding, are connected to terminal 25 provided on circuit board 13. The AC power output from generator G by the rotation of inner ring 4 is converted into DC power by power supply circuit 17.

The region of sensor unit 6 of bearing device 1 may be divided into two in the radial direction of retaining member 12 by a partition wall (not shown). Also in this case, circuit board 13 is arranged in the radially outer region, and stator 5 of craw-pole-type generator G is arranged in the radially inner region, similarly to the above. Magnetic ring 7 is arranged on the inner diameter side facing stator 5.

Functions and Effects

Bearing device 1 of the present embodiment has the following features in addition to the structure of Embodiment 1. Power supply PWR (see FIG. 1) is an electromagnetic generator (generator G) including magnetic ring 7 fixed to the other ring different from the any one ring of outer ring 3 and inner ring 4, and coil 24 attached to retaining member 12 so as to face magnetic ring 7 in the radial direction of bearing 2. A plurality of permanent magnets or a magnetic body having a plurality of magnetic poles may be fixed to magnetic ring 7 as multipolar magnet 7*b*.

In bearing device 1, stator 5 and magnetic ring 7 radially arranged constitute craw-pole-type generator G. Thus, stator 5 and magnetic ring 7 can achieve a stable amount of power generation by generator G. The thus generated electric power can be used in wireless communication circuit 18, enabling stable wireless transmission of radio waves to outside of bearing 2.

In bearing device 1 according to the present embodiment, only part of the power supply that can generate electric power is fixed to retaining member 12. Generator G serving as the power supply, which is an electromagnetic generator, includes magnetic ring 7 and stator 5. Stator 5 is fixed to retaining member 12. This is because retaining member 12 is stator 5A, which is part of stator 5, and bobbin 23 and coil 24, which constitute stator 5, are fixed to retaining member 12. On the other hand, magnetic ring 7 faces stator 5 and is fixed to the inner ring 4, which is a rotating ring, side. In other words, magnetic ring 7 is not fixed to retaining member 12. Thus, only a member of generator G excluding magnetic ring 7 is fixed to retaining member 12.

In bearing device 1 of the present embodiment, wireless communication circuit 18 includes operation unit 18*b*. Wireless communication circuit 18 is mounted on circuit board 13 fixed to retaining member 12, and retaining member 12 is fixed to any one ring of outer ring 3 and inner ring 4 included in bearing 2. Thus, operation unit 18*b* is arranged in the opened space of retainer 9. Operation unit 18*b* wirelessly transmits data on the gas analysis result received from gas sensor SSR to outside. Since gas sensor SSR and operation unit 18*b* are both arranged in the opened space of retainer 9, the distance between gas sensor SSR and operation unit 18*b* decreases. This increases the reliability of the data on the gas analysis result transmitted from operation unit 18*b* (wireless communication circuit 18) to outside. This is because data receiving sensitivity increases in operation unit 18*b*.

Embodiment 3

Figure 8:
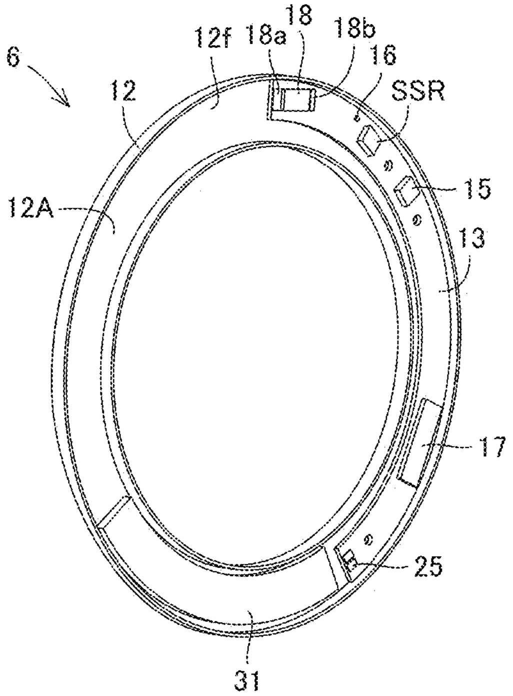
FIG. 8 is a perspective view of a sensor unit in Embodiment 3.

FIG. 8 is a perspective view of a sensor unit in Embodiment 3. Referring to FIG. 8, in Embodiment 3, a storage battery 31 is used as power supply PWR included in bearing device 1 of Embodiment 1. Storage battery 31 is fixed to front surface 12*f* of side plate portion 12A of retaining member 12. In other words, storage battery 31 preferably has, for example, an arc planar shape so as to conform to the shape of front surface 12*f*. Storage battery 31 may be a plurality of storage elements mounted on a substrate. Storage battery 31 corresponds to electromagnetic generator G in Embodiment 2. Note that generator G generates AC power, whereas storage battery 31 generates DC power. For this reason, power supply circuit 17 in the present embodiment does not have the function of rectifying AC power to DC power as described in Embodiment 2. Power supply circuit 17 of the present embodiment controls a voltage value to a target value by stepping up or down a voltage.

Embodiment 4

Figure 9:
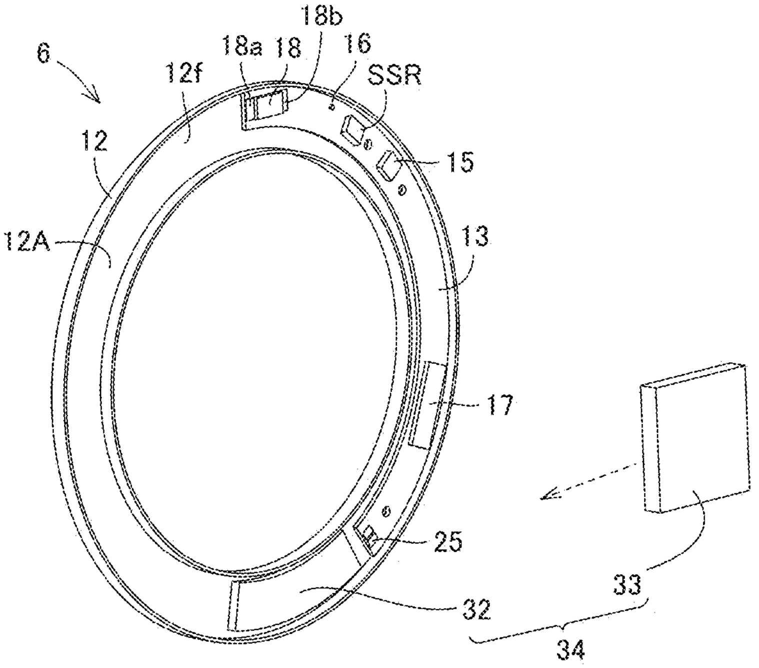
FIG. 9 is a perspective view of a sensor unit in Embodiment 4.

FIG. 9 is a perspective view of a sensor unit in Embodiment 4. Referring to FIG. 9, in Embodiment 4, a feeding device 34 including a power reception circuit 32 and a power transmission circuit 33, which transmits a signal to power reception circuit 32 in a contactless manner, is used as power supply PWR included in bearing device 1 of Embodiment 1. Power reception circuit 32 is fixed to front surface 12*f* of side plate portion 12A of retaining member 12. In other words, (the substrate of) power reception circuit 32 preferably has, for example, an arc planar shape so as to conform to the shape of front surface 12*f*. Feeding device 34 corresponds to storage battery 31 in Embodiment 3 and functions similarly to storage battery 31.

Embodiment 5

<Structure of Bearing Device>

Figure 10:
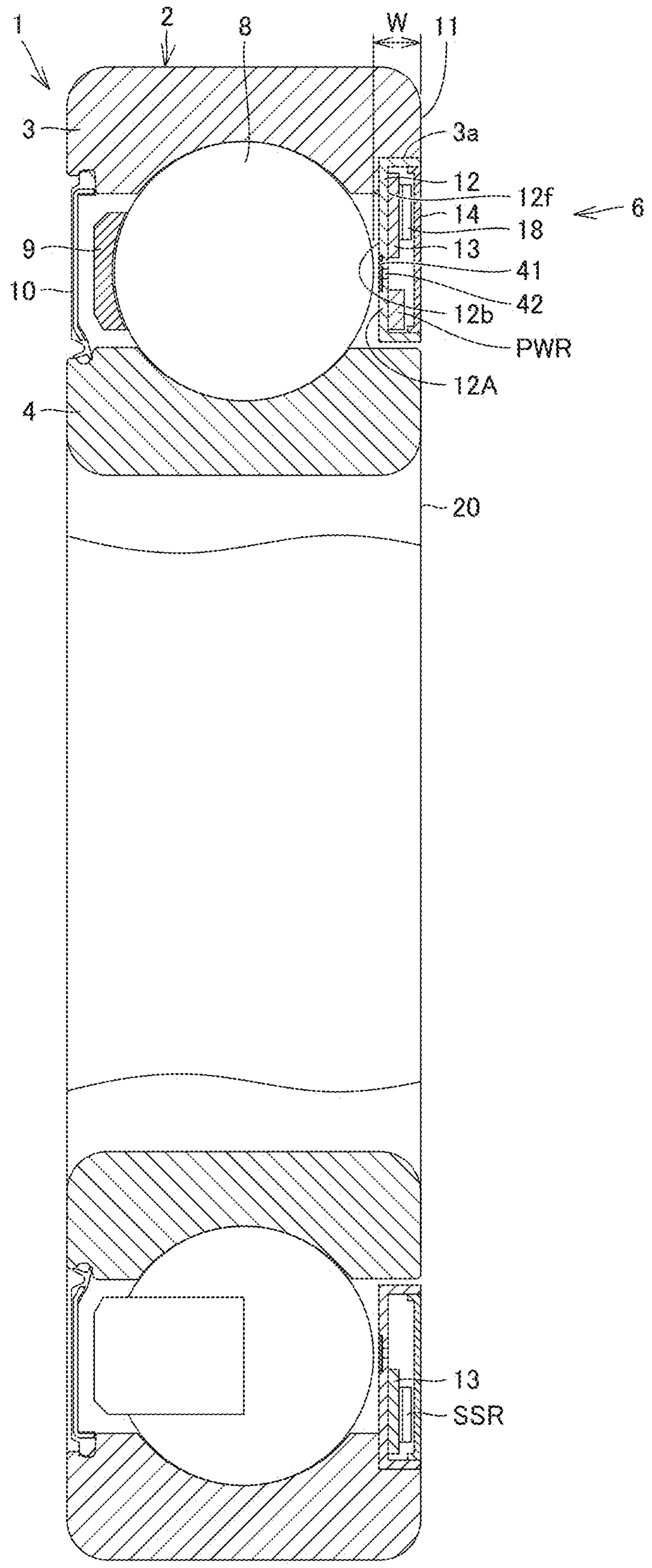
FIG. 10 is a sectional view of a bearing device of Embodiment 5.

FIG. 10 is a sectional view of a bearing device of Embodiment 5. This corresponds to a sectional view in a plane including axis of rotation O in FIG. 11 of Embodiment 6, which will be described later. In FIG. 10, the position of each member fixed to retaining member 12 is not necessarily consistent with its actual position. Referring to FIG. 10, bearing device 1 of the present embodiment basically has a similar structure to that of bearing device 1 of FIG. 1 described above, and accordingly, the description of matters overlapping those of Embodiment 1 will be omitted as appropriate.

Side plate portion 12A is arranged, at a position axially closest to rolling element 8 in retaining member 12 (on the inner side in bearing 2), adjacent to rolling element 8. Side plate portion 12A has back surface 12*b* (first surface) on the side facing rolling element 8 and front surface 12*f* (second surface) on the side opposite to back surface 12*b* (i.e., the side not facing rolling element 8). In other words, back surface 12*b* faces the inside of bearing 2, and front surface 12*f* faces the outside of bearing 2.

Side plate portion 12A has a through hole 42 connecting back surface 12*b* to front surface 12*f*. Through hole 42 is contiguous to the space adjacent to rolling element 8 inside bearing 2. A porous membrane 41 is attached so as to cover through hole 42. In particular, herein, porous membrane 41 covers through hole 42 axially from the rolling element 8 side (back surface 12*b* side), thereby closing through hole 42. In other words, porous membrane 41 closes through hole 42 in the axial direction.

Porous membrane 41 mainly contains a fluororesin. In other words, porous membrane 41 is mostly made of the fluororesin though it may contain a trace amount of material other than the fluororesin. The size (the diameter of a largest part) of a hole included in porous membrane 41 is, for example, preferably 10 nm or more and 100 μm or less, and more preferably, 100 nm or more and 10 μm or less. In FIG. 10, porous membrane 41 is arranged in through hole 42 so as to close a cross section intersecting the direction (axial direction) of extension of through hole 42.

At least part of power supply PWR that can generate electric power and circuit board 13 are fixed to retaining member 12. Power supply PWR of FIG. 10 may be the power supply in any of Embodiments 6 and 7, which will be described later, or may be a power supply of any other type. In other words, power supply PWR of FIG. 10 is a general term for power supplies of every type. Circuit board 13 is fixed to front surface 12*f* of side plate portion 12A of retaining member 12.

Gas sensor SSR may be, for example, a sensor employing a micro-electro mechanical systems (MEMS) technique. This gas sensor SSR has a structure in which a sensitive film that reacts to a specific gas is supported by a plurality of detection units. In gas sensor SSR, the sensitive film deforms as gas is adsorbed to the sensitive film. Gas sensor SSR detects a gas based on a distortion (a change in electric resistance) of the detection unit induced by the deformation.

Gas sensor SSR is preferably a gas sensor that detects at least any of an aldehyde and a carboxylic acid with a carbon number of 8 or less.

Functions and Effects

Bearing device 1 according to the present disclosure includes bearing 2 and retaining member 12. Bearing 2 includes outer ring 3, inner ring 4, and rolling element 8. Retaining member 12 is fixed to any one ring of outer ring 3 and inner ring 4. Retaining member 12 includes side plate portion 12A having a width in the radial direction and extending in the circumferential direction. At least part of power supply PWR that can generate electric power and circuit board 13 are fixed to retaining member 12. Circuit board 13 is fixed to, in the axial direction, the surface (front surface 12*f*) of side plate portion 12A not facing rolling element 8. At least one gas sensor SSR that detects a state of bearing 2 and wireless communication circuit 18 that wirelessly transmits an output of gas sensor SSR to outside are mounted on circuit board 13. Side plate portion 12A has through hole 42 that connects the first surface (back surface 12*b*) facing rolling element 8 to the second surface (front surface 12*f*) located opposite to the first surface and is contiguous to a space adjacent to rolling element 8. Porous membrane 41 is attached so as to cover through hole 42.

In bearing device 1 described above, through hole 42 may be formed to connect an internal space formed between outer ring 3 and inner ring 4 of bearing 2 to a space in which gas sensor SSR is arranged. The internal space formed between outer ring 3 and inner ring 4 is a space in which rolling element 8 is arranged.

Since circuit board 13 is fixed to front surface 12*f*, circuit board 13 is fixed onto retaining member 12 so as to face the outside of bearing 2. For this reason, even when a metallic retaining member having rigidity higher than that of a resin is used as retaining member 12, the following problem can be suppressed, for example, a problem of failing to transmit radio waves from wireless communication circuit 18 or the like mounted on circuit board 13 to outside of bearing 2 because the radio waves are blocked. In other words, wireless transmission of radio waves to outside of bearing 2 can be performed stably.

Wireless transmission of radio waves to outside of bearing 2 can be performed stably by wireless communication circuit 18 that receives an output signal of gas sensor SSR and wirelessly transmits the output signal to outside.

Further, for example, a gas generated by oxidation of a lubricant in bearing 2 passes through a hole formed in porous membrane 41. Porous membrane 41 allows the above-mentioned gas of the product to pass therethrough but prevents intrusion of abrasion powder, dust, and oil content into bearing 2. As porous membrane 41 is attached to through hole 42 of side plate portion 12A, only the gas of the product can pass through from the inside of bearing 2 to the front surface 12*f* side of side plate portion 12A. This allows supply of a gas to, for example, gas sensor SSR mounted on circuit board 13 on the front surface 12*f* side. Thus, gas sensor SSR can detect only the gas generated by the lubricant with high accuracy.

Owing to the function of porous membrane 41 described above, the present embodiment can suppress the following problem, for example, a problem of short-circuit or deterioration of wireless communication circuit 18 due to intrusion of a metallic foreign body and a lubricant into (e.g., wireless communication circuit 18 mounted on) circuit board 13 on the front surface 12*f* side.

According to the present disclosure, thus, bearing device 1 can be provided that can prevent a decrease in detection sensitivity of gas sensor SSR and can stably perform wireless transmission of radio waves to outside of bearing 2, irrespective of the quality of material of retaining member 12.

In bearing device 1 described above, circuit board 13 is covered with non-metallic lid 14. This can suppress accidental escape of the gas generated inside bearing 2 from gas sensor SSR after flowing to gas sensor SSR mounted on circuit board 13. This is because lid 14 blocks a flow of the gas. As a result, the gas generated inside bearing 2 can be supplied to gas sensor SSR more reliably. This further increases the gas detection sensitivity in gas sensor SSR.

In bearing device 1 described above, porous membrane 41 is preferably arranged in through hole 42 so as to close the cross section intersecting the direction of extension of through hole 42. Consequently, the gas passing through porous membrane 41 easily flows through through hole 42 toward gas sensor SSR.

The axial position of porous membrane 41 in through hole 42 may be any position. In other words, porous membrane 41 may be arranged on the front surface 12*f* side (right) or arranged at the central portion in through hole 42 in FIG. 10. Porous membrane 41 is more preferably arranged on the back surface 12*b* side (left) in through hole 42. Thus, porous membrane 41 is arranged at a position closer to outer ring 3, inner ring 4, and rolling element 8 inside bearing 2. Consequently, the gas generated by the lubricant or the like inside bearing 2 reaches porous membrane 41 more easily. This facilitates inflow of the gas from porous membrane 41 into through hole 42 and toward gas sensor SSR.

In bearing device 1 described above, preferably, porous membrane 41 mainly contains a fluororesin. Thus, porous membrane 41 allows only the gas generated by oxidation of the lubricant of bearing 2 to flow therethrough and allows inflow of the gas toward gas sensor SSR mounted on circuit board 13. In other words, porous membrane 41 prevents intrusion of abrasion powder, dust, and oil content inside bearing 2 to gas sensor SSR and wireless communication circuit 18 on circuit board 13.

In bearing device 1 described above, gas sensor SSR detects at least any of an aldehyde and a carboxylic acid with a carbon number of 8 or less. Specifically, what is detected by gas sensor SSR is preferably a gas of each compound shown in Table 1 (chain aliphatic aldehydes) and Table 2 (carboxylic acids) below.

TABLE 1

| Name | Molecular formula | Boiling point (° C.) |
|---|---|---|
| Formaldehyde | $CH_2O$ | −19.3 |
| Acetaldehyde | $C_2H_4O$ | 20.2 |
| Propionaldehyde | $C_3H_6O$ | 48 |
| Butylaldehyde | $C_4H_8O$ | 85 |
| Valeraldehyde | $C_5H_{10}O$ | 103 |
| Hexanal | $C_6H_{12}O$ | 129 |
| Heptanal | $C_7H_{14}O$ | 153 |
| Octanal | $C_8H_{16}O$ | 171 |

TABLE 2

| Name | Molecular formula | Boiling point (° C.) |
|---|---|---|
| Formic acid | $CH_2O_2$ | 101 |
| Acetic acid | $C_2H_4O_2$ | 141 |
| Propionic acid | $C_3H_6O_2$ | 141 |
| Butyric acid | $C_4H_8O_2$ | 163 |

Tables 1 and 2 show chain aliphatic aldehydes and carboxylic acids having a low molecular weight. In these compounds, a compound with a smaller carbon number has a lower boiling point (i.e., volatiles more easily). Thus, the gas of the compound with a small carbon number is suitable for a target to be detected by a gas sensor. The temperature conditions on which bearing 2 is used are varied. A typical material for the rolling bearing is SUJ2, which is carbon steel for bearings. The allowable upper-limit temperature of a bearing produced by a standard heat treatment of SUJ2 is approximately 120° C. However, the bearing can be used at 200° C. or higher temperature by being subjected to dimensional stabilization. Considering such operating conditions for typical bearings, an aldehyde and a carboxylic acid with a carbon number of 8 or less are particularly suitable as a target product for detecting oxidation of a lubricant.

In bearing device 1 described above, bearing 2 includes retainer 9 retaining rolling elements 8 at intervals in the circumferential direction. Retainer 9 has a shape to be opened on the first end face side and coupled on the second end face side in the axial direction. Retaining member 12 is arranged at a position on the first end face side of retainer 9 relative to rolling element 8.

In bearing device 1 described above, since one axial end face of retainer 9 is opened, a space in which circuit board 13, power supply PWR, and the like are arranged is provided in the opened portion (the portion in which retainer 9 is originally arranged). In other words, the space for arranging circuit board 13 and power supply PWR is effectively provided inside bearing 2. Also, gas sensor SSR that detects the state of, for example, deterioration of the lubricant of bearing 2 can be arranged in the space described above. Thus, gas sensor SSR can be arranged at a position very close to bearing 2, enabling highly accurate detection of an abnormality of bearing 2 by gas sensor SSR.

What are more prone to oxidation due to, particularly, heat and metal (abrasion powder) are the parts of the lubricant, which are close to outer ring 3, inner ring 4, and rolling element 8 of bearing 2. Thus, when gas sensor SSR is arranged in the space described above, deterioration due to oxidation of the lubricant can be detected with high accuracy.

In bearing device 1 described above, retaining member 12 may be made of metal.

Since retaining member 12 is made of metal, retaining member 12 can retain circuit board 13 and gas sensor SSR placed on circuit board 13 so as to have high rigidity. Accordingly, if retaining member 12 is directly fixed to vibrating bearing 2, a malfunction of gas sensor SSR can be suppressed. This allows bearing device 1 to stably perform monitoring of deterioration of the lubricant by gas sensor SSR and wireless transmission of data detected by gas sensor SSR, even in a use environment in which vibrations are applied.

Embodiment 6

<Structure of Bearing Device>

Figure 11:
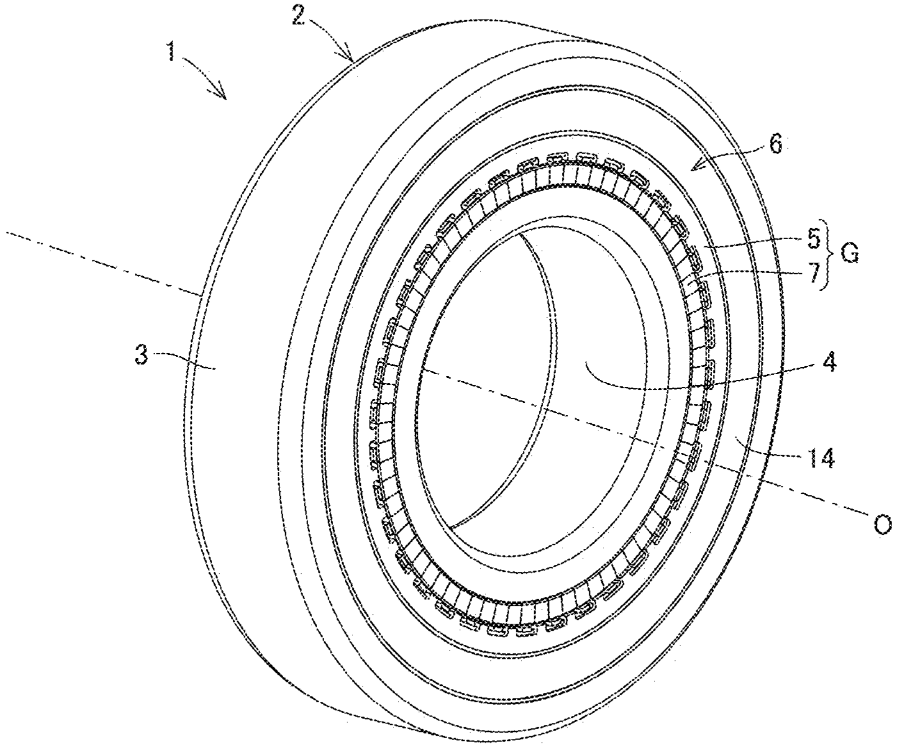
FIG. 11 is a perspective view of the entire bearing device of Embodiment 6.

In the description of the bearing device in each embodiment described below, the same components as those of the bearing device of the embodiment described above have the same reference characters allotted, and description thereof will not be repeated unless there is any difference particularly in structure and function. In Embodiment 6, an electromagnetic generator is used as power supply PWR included in bearing device 1 of Embodiment 5. FIG. 11 is a perspective view of the entire bearing device of Embodiment 6. Referring to FIG. 11, bearing device 1 includes bearing 2, sensor unit 6, and magnetic ring 7. Since FIG. 11 shows components similar to those of FIG. 2, description of the matters overlapping those of FIG. 2 will be omitted as appropriate.

Lid 14, which is a non-metallic member made of resin, protects the inside of sensor unit 6. Lid 14 of the present embodiment may be arranged so as to cover the region other than stator 5 as in FIG. 12. Alternatively, lid 14 may be arranged so as to cover stator 5 as well. In any case, lid 14 covers circuit board 13. In order to increase gas detection sensitivity by gas sensor SSR, the distance between gas sensor SSR and through hole 42 is preferably smaller. For this reason, FIG. 12, which will be described next, shows gas sensor SSR at the position of wireless communication circuit 18 in the other figures. However, the position of each member in retaining member 12 does not necessarily indicate its actual position in FIG. 12 and the following sectional views, similarly to FIG. 10.

Figure 12:
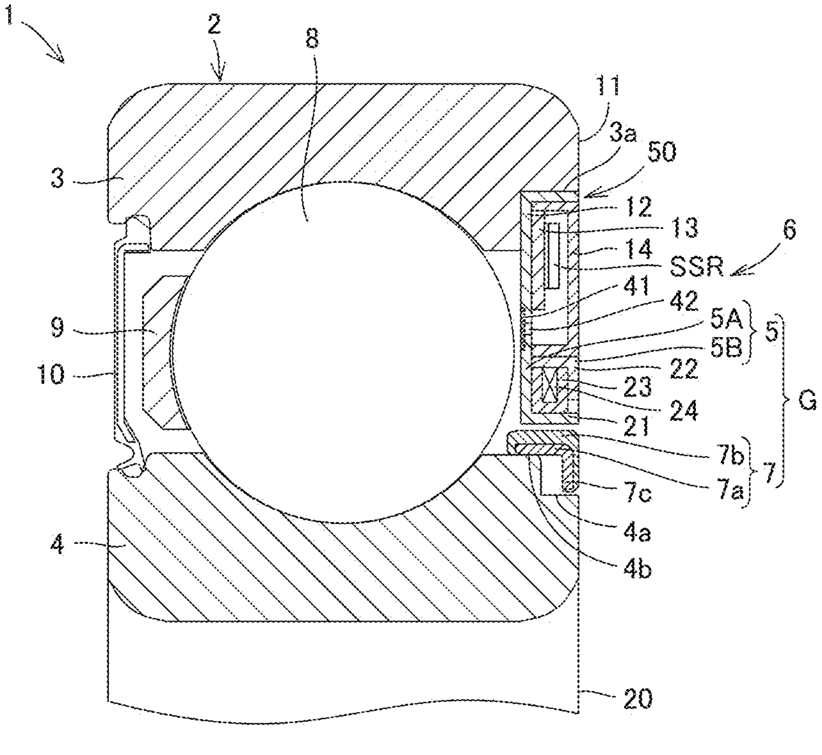
FIG. 12 is a sectional view of a bearing in a plane including an axis of rotation.

FIG. 12 is a sectional view of a bearing in a plane including an axis of rotation. Referring to FIG. 12, stepped first cut-away portion 3*a* is formed in the inner circumferential surface of outer ring 3 at one end, as in Embodiment 5. Further, stepped second cut-away portion 4*a* is formed in the outer circumferential surface of inner ring 4 at one end so as to face first cut-away portion 3*a*. In the axial direction of bearing 2, annular recess 50, which is cut out toward rolling element 8 by first cut-away portion 3*a* and second cut-away portion 4*a*, is formed over outer ring 3 and inner ring 4. Since FIG. 12 basically shows components similar to those of FIG. 3 except that porous membrane 41 and through hole 42 are provided, description of the overlapping matters will not be repeated.

Figure 13:
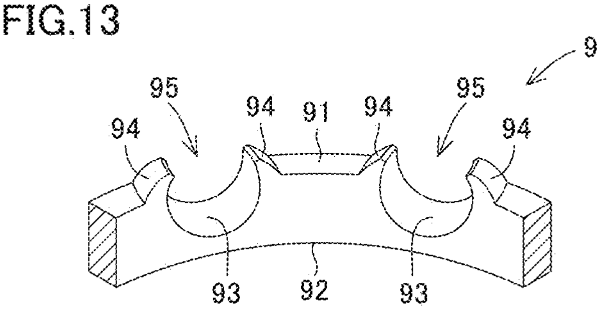
FIG. 13 is a view for describing a retainer.

FIG. 13 is a view for describing a retainer. FIG. 13 shows similar components to those of FIG. 4, and accordingly, description thereof will not be repeated.

Figure 14:
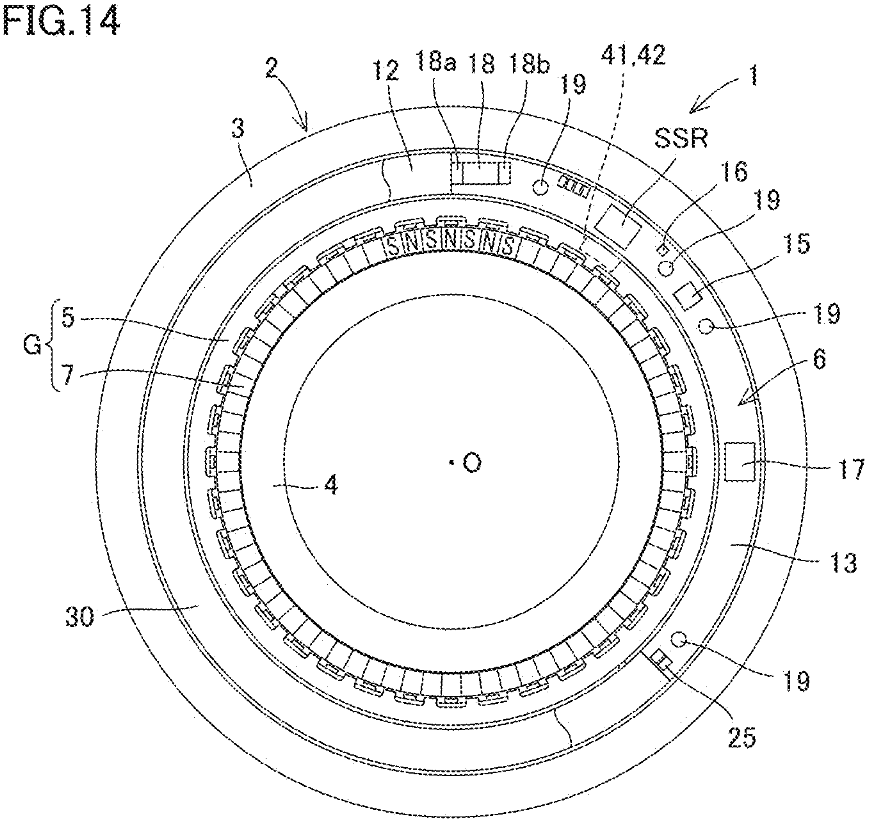
FIG. 14 is a view of the bearing device viewed from the sensor unit side.

FIG. 14 is a view of a bearing device viewed from the sensor unit side. In FIG. 14, part of lid 14 is omitted such that the inside of sensor unit 6 is visible. Referring to FIG. 14, one or more gas sensors SSR that monitor the state of bearing 2 are mounted on circuit board 13. In addition, for example, acceleration sensor 15 and temperature sensor 16 may be mounted on circuit board 13. Since FIG. 14 basically shows similar components to those of FIG. 5 except that porous membrane 41 and through hole 42 are provided, description of the overlapping matters will not be repeated.

Figure 15:
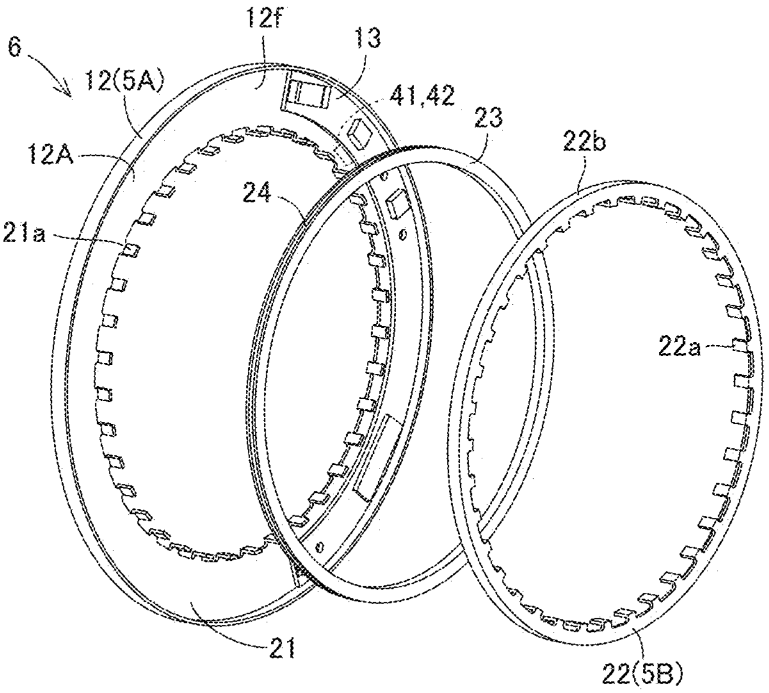
FIG. 15 is an exploded perspective view of a sensor unit in Embodiment 6.
Figure 16:
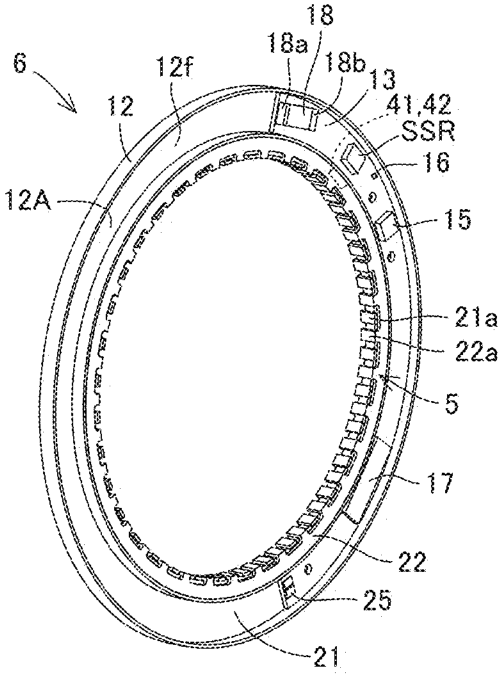
FIG. 16 is a perspective view of the sensor unit after being assembled in Embodiment 6.

FIG. 15 is an exploded perspective view of a sensor unit in Embodiment 6. FIG. 16 is a perspective view of the sensor unit after being assembled in Embodiment 6. Since FIGS. 15 and 16 basically show similar components to those of FIGS. 6 and 7 except that porous membrane 41 and through hole 42 are provided, description thereof will not be repeated.

The method of assembling stator 5 is similar to that of Embodiment 2 described above, and accordingly, description thereof will not be repeated.

Functions and Effects

Similarly to Embodiment 5, the present embodiment includes porous membrane 41 and through hole 42 and exhibits similar functions and effects to those of Embodiment 5. In other words, circuit board 13 is covered with non-metallic lid 14. This can suppress accidental escape of the gas generated inside bearing 2 from gas sensor SSR after flowing to gas sensor SSR mounted on circuit board 13. This is because lid 14 blocks a flow of the gas.

In bearing device 1 of the present embodiment, power supply PWR (see FIG. 10) is an electromagnetic generator (generator G) including magnetic ring 7 fixed to the other ring different from the any one ring of outer ring 3 and inner ring 4, and coil 24 attached to retaining member 12 so as to face magnetic ring 7 in the radial direction of bearing 2. A plurality of permanent magnets or a magnetic body having a plurality of magnetic poles may be fixed to magnetic ring 7 as multipolar magnet 7*b*.

Stator 5 and magnetic ring 7 radially arranged in bearing device 1 constitute craw-pole-type generator G. Thus, stator 5 and magnetic ring 7 can achieve a stable amount of power generation by generator G. The thus generated electric power can be used in wireless communication circuit 18, enabling stable wireless transmission of radio waves to outside of bearing 2.

In bearing device 1 according to the present embodiment, only part of the power supply that can generate electric power is fixed to retaining member 12. Generator G serving as the power supply, which is an electromagnetic generator, includes magnetic ring 7 and stator 5. Stator 5 is fixed to retaining member 12. This is because retaining member 12 is stator 5A, which is part of stator 5, and bobbin 23 and coil 24, which constitute stator 5, are fixed to retaining member 12. On the other hand, magnetic ring 7 faces stator 5 and is fixed to the inner ring 4, which is a rotating ring, side. In other words, magnetic ring 7 is not fixed to retaining member 12. Thus, only a member of generator G excluding magnetic ring 7 is fixed to retaining member 12.

In bearing device 1 of the present embodiment, wireless communication circuit 18 includes operation unit 18*b*. Wireless communication circuit 18 is mounted on circuit board 13 fixed to retaining member 12, and retaining member 12 is fixed to any one ring of outer ring 3 and inner ring 4 included in bearing 2. Thus, operation unit 18*b* is arranged in the opened space of retainer 9. Operation unit 18*b* wirelessly transmits data on the gas analysis result received from gas sensor SSR to outside. Since gas sensor SSR and operation unit 18*b* are both arranged in the opened space of retainer 9, the distance between gas sensor SSR and operation unit 18*b* decreases. This increases the reliability of the data on the gas analysis result transmitted from operation unit 18*b* (wireless communication circuit 18) to outside. This is because data receiving sensitivity increases in operation unit 18*b*.

Embodiment 7

Figure 17:
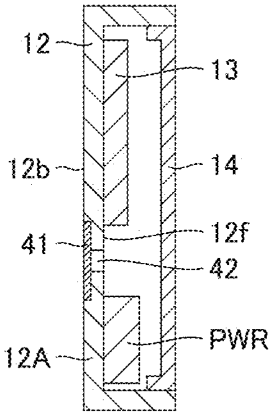
FIG. 17 is an enlarged sectional view of a sensor unit of FIG. 10 in Embodiment 5.
Figure 18:
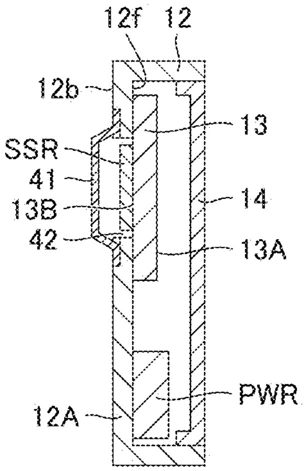
FIG. 18 is an enlarged sectional view of a sensor unit of FIG. 19 in Embodiment 7.

FIG. 17 is an enlarged sectional view of a sensor unit of FIG. 10 in Embodiment 5. FIG. 18 is an enlarged sectional view a sensor unit of FIG. 19 in Embodiment 7. Referring to FIGS. 17 and 18, Embodiment 5 and Embodiment 7 are similar in that through hole 42 passing through side plate portion 12A from back surface 12*b* to front surface 12*f* is formed and that porous membrane 41 is attached so as to cover through hole 42 in the axial direction. However, porous membrane 41 is arranged within through hole 42 in Embodiment 5, whereas porous membrane 41 is spaced from through hole 42 outside of through hole 42 in Embodiment 7. Embodiment 7 is different from Embodiment 5 in this point.

Figure 19:
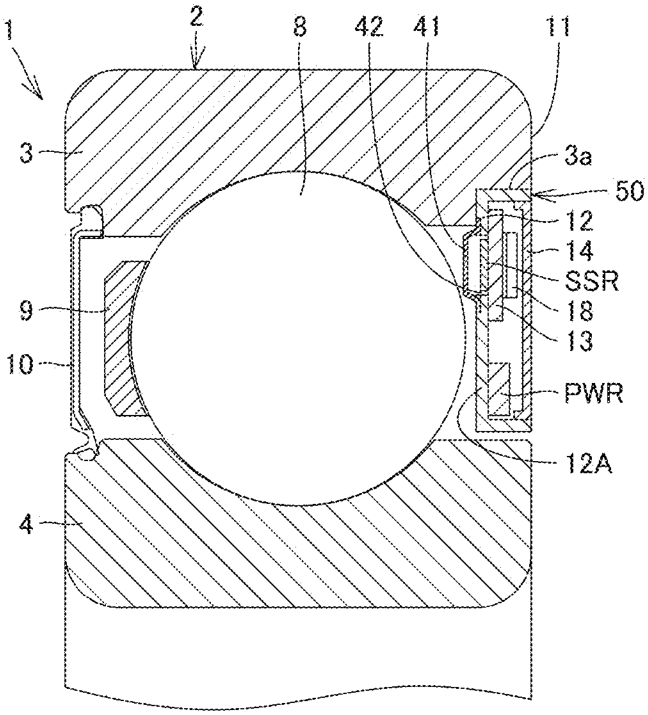
FIG. 19 is a sectional view of a bearing in a plane including an axis of rotation in a first example of Embodiment 7.

FIG. 19 is a sectional view of a bearing in a plane including an axis of rotation in a first example of Embodiment 7. Referring to FIG. 19, in Embodiment 7, gas sensor SSR is arranged in through hole 42. To that end, gas sensor SSR is mounted on the surface of circuit board 13, to which side plate portion 12A is fixed, on the side facing rolling element 8 (similarly to back surface 12*b*). In this respect, Embodiment 7 is different from Embodiment 5 in which gas sensor SSR is mounted on the surface of circuit board 13 opposite to the side facing rolling element 8 (similarly to front surface 12*f*).

In the present embodiment, porous membrane 41 is formed so as to float relative to through hole 42. In other words, porous membrane 41 is bonded onto the region of back surface 12*b* which is adjacent to through hole 42. This porous membrane 41 covers through hole 42 from the rolling element 8 side in the axial direction. Note that porous membrane 41 has a sectional shape bent with a larger distance from back surface 12*b* in the region overlapping through hole 42 than in the region on back surface 12*b* adjacent to through hole 42. Thus, porous membrane 41 is spaced from through hole 42 in the axial direction so as to cover through hole 42 at a position at which porous membrane 41 overlaps through hole 42 in a planar manner.

Figure 20:
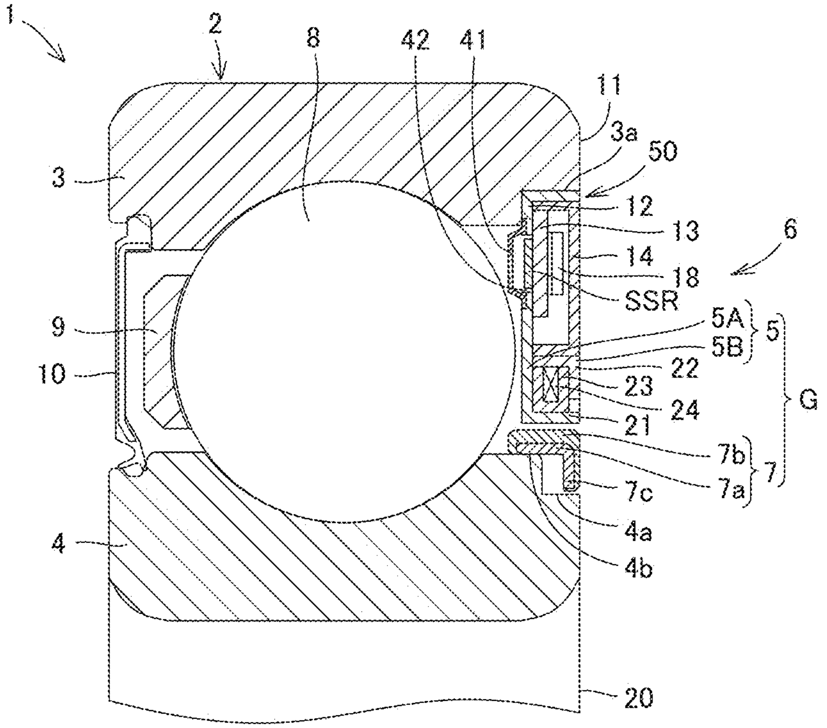
FIG. 20 is a sectional view of a bearing in a plane including an axis of rotation in a second example of Embodiment 7.

FIG. 20 is a sectional view of a bearing in a plane including an axis of rotation in a second example of Embodiment 7. Referring to FIG. 20, power supply PWR similar to that of FIG. 10 is shown in the first example of FIG. 19, whereas craw-pole-type generator G similar to that of FIG. 12 is used in the second example of FIG. 20. Porous membrane 41 and gas sensor SSR of FIG. 20 are similar to those of FIG. 19.

As in each example of the present embodiment, gas sensor SSR may be inserted through through hole 42 provided in side plate portion 12A of retaining member 12 and mounted on the back surface (the surface facing rolling element 8 inside bearing 2) of circuit board 13 so as to be close to (or be in contact with) the end face of first cut-away portion 3*a* of outer ring 3. This causes gas sensor SSR to approach outer ring 3, enabling accurate detection of deterioration of the lubricant of bearing 2. The functions and effects achieved by porous membrane 41 are similar to those of Embodiments 5 and 6.

The features described in (the examples included in) the respective embodiments described above may be applied in combination as appropriate within the range where there is no technical inconsistency.

It is to be understood that the embodiments disclosed herein are presented for the purpose of illustration and non-restrictive in every respect. It is therefore intended that the scope of the present invention is defined by claims, not only by the embodiments described above, and encompasses all modifications and variations equivalent in meaning and scope to the claims.

REFERENCE SIGNS LIST

1 bearing device; 2 bearing; 3 outer ring; 3*a* first cut-away portion; 4 inner ring; 4*a* second cut-away portion; 4*b* outside surface; 5, 5A, 5B stator; 6 sensor unit; 7 magnetic ring; 7*a* core metal; 7*b* multipolar magnet; 7*c* flange portion; 8 rolling element; 9 retainer; 10 seal; 11, 20, 91, 92 end face; 12 retaining member; 12A side plate portion; 12*b* back surface; 12*f* front surface; 13 circuit board; 14 lid; 15 acceleration sensor; 16 temperature sensor; 17 power supply circuit; 18 wireless communication circuit; 18*a* antenna portion; 18*b* operation unit; 19 screw; 21, 22 magnetic member; 21*a*, 22*a* claw portion; 23 bobbin; 24 coil; 25 terminal; 31 storage battery; 41 porous membrane; 42 through hole; 50 annular recess; 93 recess; 94 claw portion; 95 pocket; PWR power supply; SSR gas sensor.

The invention claimed is:

1. A bearing device comprising:

a bearing including an outer ring, an inner ring, and a rolling element; and a retaining member, wherein the retaining member is fixed to any one ring of the outer ring and the inner ring, the retaining member includes a side plate portion having a width in a radial direction and extending in a circumferential direction, at least part of a power supply that generates electric power and a circuit board are fixed to the retaining member, the circuit board is fixed to, in an axial direction, a surface of the side plate portion not facing the rolling element, at least one gas sensor and a wireless communication circuit are mounted on the circuit board, the at least one gas sensor detecting a state of the bearing, the wireless communication circuit wirelessly transmitting an output of the at least one gas sensor to outside, the power supply is an electromagnetic generator including a magnetic ring fixed to the other ring different from the any one ring of the outer ring and the inner ring, and a coil attached to the retaining member so as to face the magnetic ring in a radial direction of the bearing, the retaining member is part of a stator, the stator includes a first stator and a second stator that are facing each other, a bobbin and the coil are attached between and surrounded by the first stator and the second stator, the first stator, the second stator, the bobbin and the coil are arranged so as not to extend axially outward beyond an end face of the outer ring and an end face of the inner ring, and the circuit board is retained by the first stator.

2. The bearing device according to claim 1, wherein the wireless communication circuit includes an operation unit.

3. The bearing device according to claim 1, wherein the bearing further includes a retainer retaining a plurality of the rolling elements at intervals in the circumferential direction, the retainer has a shape to be opened on a first end face side and coupled on a second end face side in the axial direction, and the retaining member is arranged at a position on the first end face side of the retainer relative to the rolling element.

4. The bearing device according to claim 1, wherein the retaining member is made of metal.

5. The bearing device according to claim 1, wherein the side plate portion has a through hole connecting a first surface facing the rolling element to a second surface located opposite to the first surface, and a porous membrane is attached so as to cover the through hole.

6. The bearing device according to claim 5, wherein the circuit board is covered with a non-metallic lid.

7. The bearing device according to claim 5, wherein the porous membrane is arranged in the through hole so as to close a cross section intersecting a direction of extension of the through hole.

8. The bearing device according to claim 5, wherein the gas sensor is arranged in the through hole, and the porous membrane is spaced from the through hole so as to cover the through hole at a position at which the porous membrane overlaps the through hole in a planar manner.

9. The bearing device according to claim 5, wherein the porous membrane mainly contains a fluororesin.

10. The bearing device according to claim 5, wherein the gas sensor detects at least any of an aldehyde and a carboxylic acid with a carbon number of 8 or less.

11. The bearing device according to claim 5, wherein the bearing further includes a retainer retaining a plurality of the rolling elements at intervals in the circumferential direction, the retainer has a shape to be opened on a first end face side and coupled on a second end face side in the axial direction, and the retaining member is arranged at a position on the first end face side of the retainer relative to the rolling element.

12. The bearing device according to claim 5, wherein the retaining member is made of metal.

* * * * *